United States Patent [19]

Smalser

[11] Patent Number: 5,703,474
[45] Date of Patent: Dec. 30, 1997

[54] POWER TRANSFER OF PIEZOELECTRIC GENERATED ENERGY

[75] Inventor: Paul Smalser, Hamilton Twsp., N.J.

[73] Assignee: Ocean Power Technologies, West Trenton, N.J.

[21] Appl. No.: 546,599

[22] Filed: Oct. 23, 1995

[51] Int. Cl.$^6$ .......................................... G05F 5/00
[52] U.S. Cl. .............................. 323/299; 310/318
[58] Field of Search ............................ 310/318, 319, 310/339; 323/299; 354/457

[56] References Cited

U.S. PATENT DOCUMENTS

| | | | |
|---|---|---|---|
| H372 | 11/1987 | Campbell | 310/339 |
| 4,160,234 | 7/1979 | Karbo et al. | 310/338 |
| 4,629,970 | 12/1986 | Johansson | 323/299 |
| 4,873,480 | 10/1989 | Lafferty | 323/299 |
| 5,245,242 | 9/1993 | Hall | 310/319 |
| 5,327,071 | 7/1994 | Frederick et al. | 323/299 |
| 5,400,975 | 3/1995 | Inculet et al. | 239/690.1 |
| 5,552,656 | 9/1996 | Taylor | 310/339 |

*Primary Examiner*—Stuart N. Hecker
*Attorney, Agent, or Firm*—Michael Y. Epstein; Henry I. Schanzer

[57] ABSTRACT

The electric energy generated by a piezoelectric device (PEG), when mechanically stressed, is transferred from the PEG to a storage element (e.g., a capacitor or a battery) by selectively coupling an inductor in the conduction path between the PEG and the storage element. In one embodiment, the transfer of energy is optimized by allowing the amplitude of the electric signal to reach a peak value before transferring the electrical energy via an inductive network to a capacitor or a battery for storage. Electrically, the PEG is operated without a significant loading (e.g., essentially open circuited) when the amplitude of the voltage generated by the PEG is increasing. When the amplitude of the voltage has peaked, or reached a predetermined value, the electrical energy generated by the PEG is coupled to an inductive-capacitive network for absorbing and storing the energy produced by the PEG.

24 Claims, 10 Drawing Sheets

Fig 9C too long anode of D3 are connected to terminal 14. So connected, a positive going signal produced by PEG 10 causes a current to flow from terminal 12 via diode D1 into terminal 18 and via a load connected between terminals 18 and 20 and then via diode D2 into terminal 14. A negative going signal produced by PEG 10 causes a current to flow from terminal 14 via diode D3 into terminal 18 and then from terminal 18 into terminal 20 via a load connected between the two terminals and then via diode D2 into terminal 14.

The signal produced at terminal 18 will then always be, or go, positive with respect to the voltage at terminal 20; which is assumed to be at ground potential. For the condition of the applied force shown, for example, in waveform A of FIG. 3, a voltage V1 of the type shown in waveform B of FIG. 3 may be produced, and in response thereto a full wave rectified voltage V2 would be produced across terminals 18 and 20, as shown in waveform C of FIG. 3. Note that waveform C of FIG. 3 results from the condition when there is no load connected between terminals 18 or 20, or, when a purely resistive load is connected between terminals 18 and 20. For such a condition (no load or resistive load), the signal at terminal 18 would be a fully rectified signal as shown for times t0-to-t20 in waveform C of FIG. 3.

Figure 1:
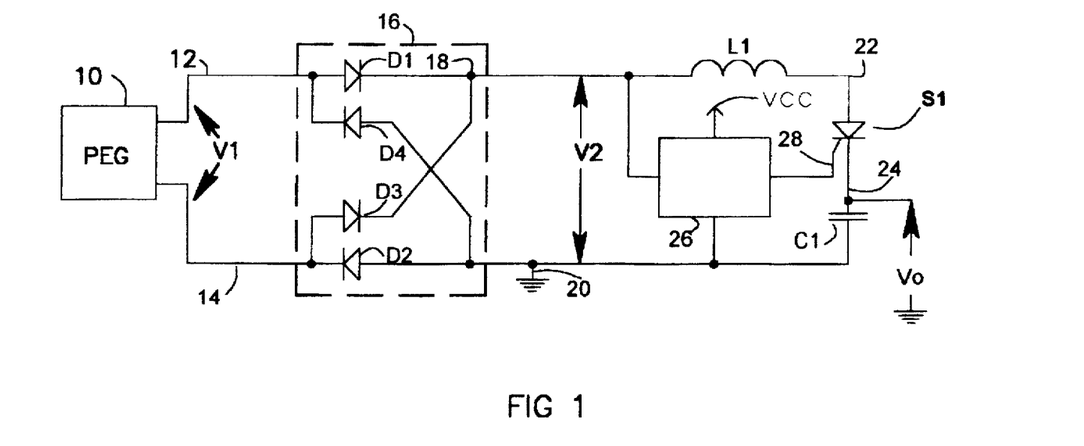
Figure 1A:
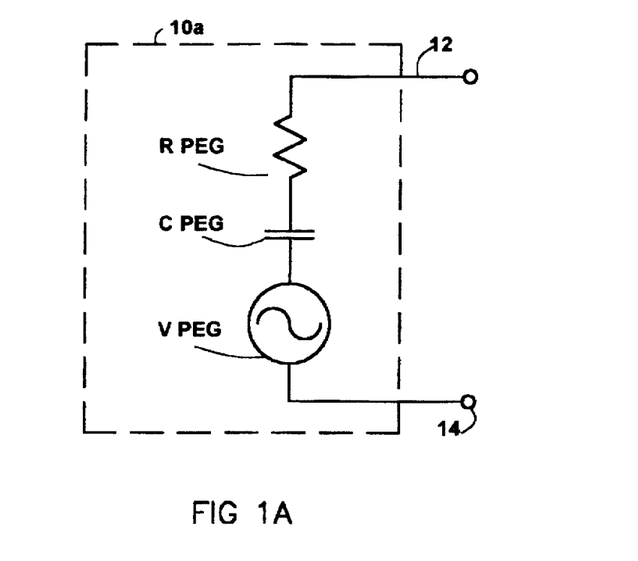

The circuit of FIG. 1 includes an inductor L1 connected between terminal 18 and a node 22 to which is connected the anode of a silicon controlled rectifier (SCR) S1. The cathode of the SCR S1 is connected at terminal 24 to one plate of a storage capacitor C1 whose other plate is connected to a ground terminal 20.

Figures 2, 2A:
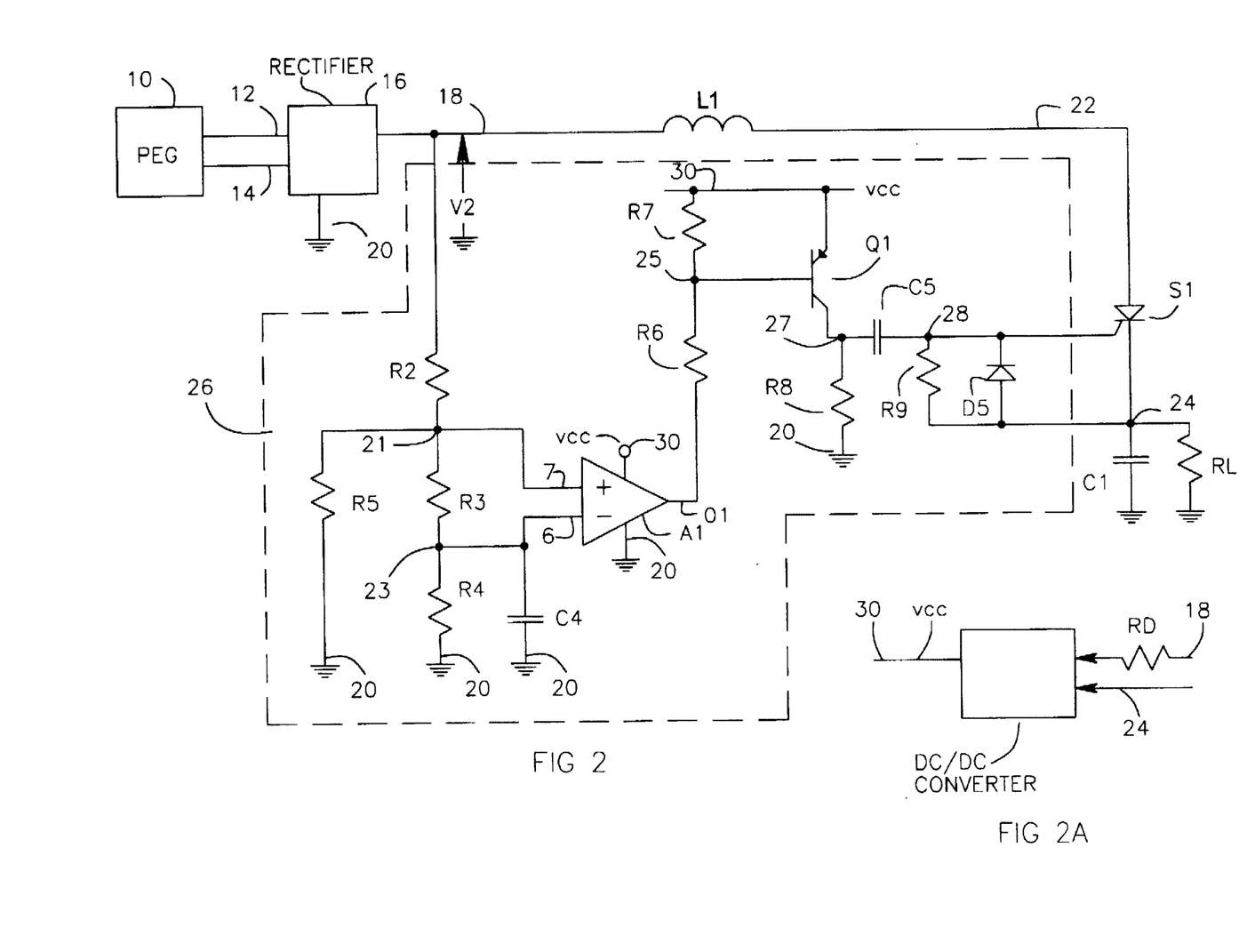

The turn-on of SCR, S1, is controlled by means of a voltage sensing and control circuit 26. Control circuit 26, as detailed in FIG. 2, is designed to turn-on the SCR S1 immediately after the voltage (V2) at terminal 18 has peaked and starts to drop after undergoing a positive going transition. The SCR S1 is then switched on and the energy generated by PEG 10 is transferred via inductor L1 and SCR S1 into capacitor C1. The turn-on of the SCR, S1, causes a current to flow through inductor L1 into capacitor C1, charging it up. Thus, when SCR, S1, is switched-on, the energy generated by PEG 10 is transferred via inductor L1 and S1 into capacitor C1.

Referring to FIG. 2, note that circuit 26 includes a resistor R2 connected between terminal 18 and node 21 to which are connected one end of resistors R3 and R5 and the positive (+) input terminal 7 of a comparator A1. Comparator A1 may be, for example, any one of a number of operational amplifiers connected to function as a comparator. The other end of resistor R3 is connected to node 23 to which are connected one end of a resistor R4, one plate of a capacitor C4 and the negative (–) input terminal 6 of comparator A1. The other ends of resistors R4 and R5 and the other plate of capacitor C4 are returned to ground. The output terminal of comparator (amplifier) A1 is connected via a resistor R6 to a node 25 to which is connected the base of a PNP bipolar transistor Q1 and one end of a resistor R7. The emitter of Q1 and the other end of resistor R7 are returned to a terminal 30 to which is applied a positive operating potential identified as Vcc. Vcc may be a direct current (dc) voltage derived from terminal 24 and/or from terminal 18, as shown in FIG. 2A. However, in some applications (such as in FIG. 4) it is preferable that the source of the Vcc voltage be a well defined regulated voltage. The collector of Q1 is connected to a terminal 27. A resistor R8 is connected between terminal 27 and ground and a coupling capacitor C5 is connected between terminals 27 and 28. A biasing resistor R9 and a diode D5 are connected in parallel between terminal 28 to which is connected the gate of SCR S1, and output terminal 24. Note that D5 is poled to conduct current from terminal 24 into terminal 28. Note also that amplifier A1 is connected between power terminals 30 and 20.

The operation of circuit 26 is as follows. Assume that initially terminal 18 is at ground potential and that the voltage (V2) at terminal 18 begins to increase. So long as V2 is increasing, the voltage at node 21 is equal to, or greater than, the voltage at node 23. Then, so long as the voltage applied to the positive (+) input terminal of A1 is equal to or greater than the voltage applied to its negative (–) input terminal, the voltage at the output terminal O1 of A1 is high or Vcc volts. For this condition, Q1 is turned off. When the voltage V2 begins to decrease (after having risen) the voltage at node 21 drops faster than the voltage at node 23. This is so because capacitor C4 tends to maintain and hold the voltage at node 23. Thus, when the voltage at terminal 18 drops, the voltage at node 21 drops with it while the voltage at node 23 tends to remain at its previous value. Consequently, following a peak at terminal 18, the voltage at the negative input terminal (6) of A1 goes positive with respect to the voltage at the positive input terminal (7) of A1 and the output O1 of A1 goes low. When O1 of A1 goes low, transistor Q1 is turned on. When Q1 turns-on, a positive going voltage level is produced at terminal 27. The positive going level is coupled via capacitor C5 to produce a positive going pulse which is applied to the gate electrode of SCR S1, turning it on. The use of an SCR is advantageous in that an SCR has a very low impedance (i.e., can carry large currents without significant voltage drops), will remain on once triggered into conduction and will turn-off automatically when the current therethrough goes below a level known as the holding current of the SCR.

When S1 is turned on, a circulating current flows from terminal 18 via inductor L1 and through the anode to cathode path of S1 into terminal 24 charging capacitor C1. The circulating current flows through C1 into terminal 20 and either through diodes D4/D1 or D2/D3 and back to terminal 18. When S1 turns on, the voltage at terminal 18 drops because of the loading of L1 and C1 and also because the voltage V2 at terminal 18 continues to decrease. As V2 decreases, the current through L1 tends to decrease. However, the magnetic flux in L1 is such that the current through L1 continues to flow in the same direction as before tending to keep charging C1 and to raise the potential at terminal 24. The charging current flows until the amplitude of the loop current drops below the holding current level of the SCR S1. When that occurs the SCR S1 turns of. Once SCR S1 is turned off, it will remain turned-off until another charging cycle is initiated (i.e., until after the voltage at terminal 18 peaks, following which a positive turn-on pulse is applied to the gate of SCR S1).

The efficiency of the circuitry shown in FIGS. 1 and 2 in transforming an electrical alternating current (AC) voltage applied between terminals 12 and 14 to a DC voltage at terminal 24 was measured to be in the range of 60% to 90%.

Figure 3:
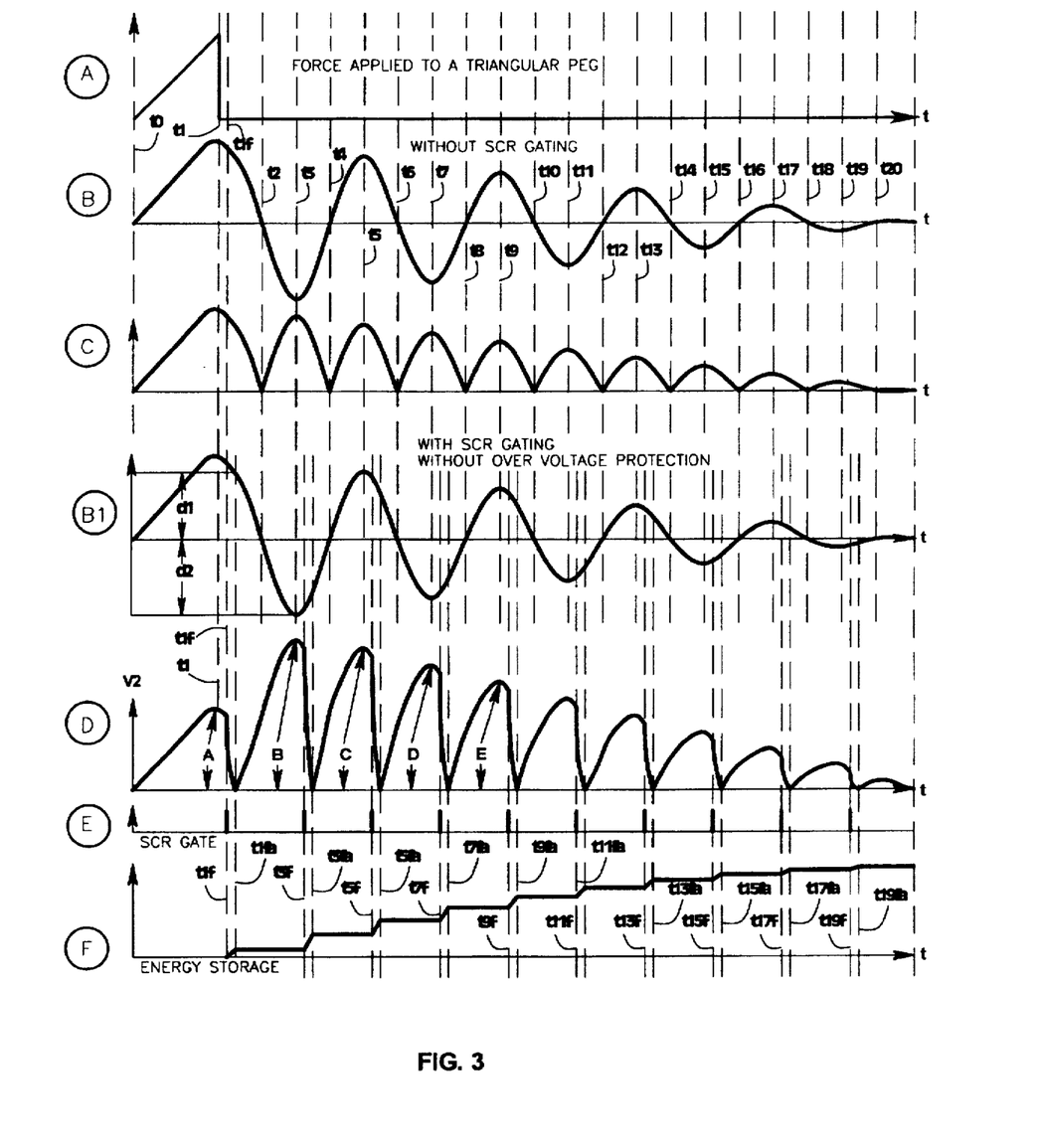

To explain more fully the operation of the circuit of FIGS. 1 and 2, reference is made to FIG. 3.

Waveform A of FIG. 3 depicts an increasing mechanical force applied to PEG 10 between time t0 and t1, causing PEG 10 to be stressed. At time t1 the force was released and PEG 10 was allowed to resonate freely. Waveform B of FIG. 3, which is a damped oscillator signal, illustrates, at once, both the physical and electrical oscillations and vibrations which the PEG 10 may undergo about a rest (or null) position after being stressed beginning at time t0 and then released at time t1. Thus, the electrical voltage (V1), developed across output terminals 12 and 14 of PEG 10, follows the physical vibration and may, therefore, have the form shown in waveform B of FIG. 3.

The output voltage (V1) of PEG 10 is applied to a full wave rectifier network 16 to produce an output voltage (V2) at terminal 18. V2 may have the form shown in waveform C for the condition where there is no load, or only a resistive load, connected between terminals 18 and 20 of rectifier network 16. Waveform D represents the waveform of V2 at terminal 18 when a switched LC network is coupled across the rectifier output, as shown in FIGS. 1 and 2, and PEG 10 is stressed as shown in waveform A of FIG. 3 to produce an output as shown in waveform B.

Referring to waveform D, note that the voltage V2 rises from a time t0 to a first peak value at time t1, during which time interval SCR S1 is off. Then, as the voltage begins to drop, the SCR S1 is turned on at time $t1_f$, shortly after t1. When S1 turns on at time $t1_f$, as discussed above, the voltage at terminal 18 is loaded by the insertion of inductor L1 in series with capacitor C1 between terminals 18 and 20, causing energy to be transferred to, and stored in, the inductor L1 and causing a current to flow and charge C1. The L1, C1 load, connected in circuit with PEG 10, causes the already dropping voltage at terminal 18 to drop further and more sharply. However, a relatively large charging current flows through the series combination of L1, S1 and C1. The charging current decreases with time, but so long as the charging current through switch S1 is greater than the holding current of S1, the latter will remain on. When the charging current drops below the holding current of S1, the latter turns off.

Figure 3A:
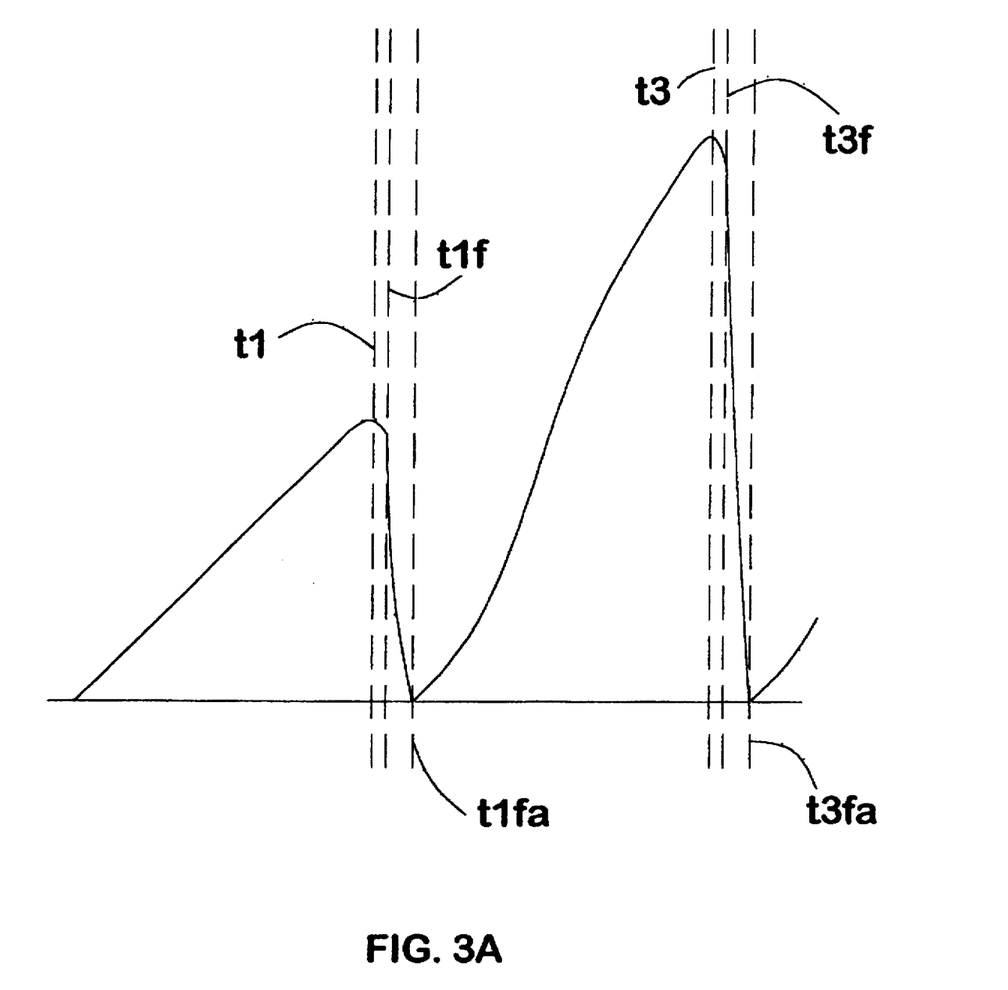

As already noted, at time t1f, the SCR S1 is switched on and a circulating current flows through L1, S1, C1 and the diode rectifying network. The circulating current causes the voltage at terminal 18 to drop very sharply as shown for time t1f to time t1fa (and every point t1f after a peak). However, as shown in expanded form in FIG. 3A, there is sufficient time (e.g., t1f to t1fa and t3f to t3fa) for a substantial amount of energy to be stored in the inductor L1 and capacitor C12, combination. Thus, even as the voltage at terminal 18 decreases towards ground, current continues to flow through inductor L1 and capacitor C1. That is, as the field through the inductor collapses, the voltage across the inductor reverses but current continues to flow through the inductor in the same direction as before. Current continues to flow until the amplitude of the current through S1 drops below the value of the holding current of SCR S1. When that occurs, S1 turns off.

An important aspect of the invention is that it enables voltage boosting. This is best explained by first noting that the amplitude of the voltage produced at terminal 18 may substantially exceed the amplitude of the initial cycle. This is illustrated in waveform D of FIG. 3, where the amplitude "A" of the first cycle (at time t1) is exceeded by the amplitude (B, C, D, E) of the voltage produced during the next four cycles (at times t3, t5, t7) ... ). To understand this phenomena note that at time t1fa, the voltage at terminal 18 is at, or close to, zero volts. At the same time, PEG 10 is physically at a distance "d1" above the rest (or null) position and will continue to travel a distance "d2" below the null position. When travelling the distance from d1 to d2, PEG 10 undergoes a stress proportional to the length of travel "d1+d2", which produces a voltage which increases from time t1fa to time t3. Since the voltage produced from time t1fa to time t3 rises above the approximately zero voltage present at time t1fa, the amplitude "B" of V2 at time t3 is much greater than the amplitude "A" of V2 at time t1. This significantly larger voltage is coupled at time t3f to the L1 and C1 network when S1 is turned on at time t3f. As illustrated in waveform D, there are several cycles during which the voltage at terminal 18 exceeds the amplitude of the first cycle. The production of enhanced amplitude voltages may be also appreciated by comparing waveform D to waveform C. Thus, in circuits embodying the invention, increased amplitude voltages are being produced even while the amplitude of the physical excursions of PEG 10 are decreasing.

As discussed above, during the portion of the cycle (t0 to $t1_f$; t1fa to $t3_f$; t3fa to $t5_f$; t5fa to $t7_f$; etc.) when the voltage produced by the PEG is increasing, the PEG is not loaded by the L1,C1 components, allowing the maximum voltage amplitude that can be developed to, in fact, be developed. After the voltage amplitude reaches a peak (i.e., at times $t1_f$, $t3_f$, $t5_f$, ... etc.) SCR S1 is turned on and inductor L1 and capacitor C1 are connected in circuit across the output terminals, 18 and 20, of rectifier network 16. When the inductor and capacitor are switched across the rectifier output, current flows through the inductor L1 and capacitor C1. As the voltage V2 decreases, the current through L1 and C1 continues to flow in the same direction as before. When the amplitude of the current through L1 decreases below the holding current of SCR S1, the SCR turns off.

As shown in waveforms D and E of FIG. 3, each time after the voltage V2 peaks and starts to drop, a turn-on pulse is produced and applied to the gate of SCR S1. Each time S1 turns-on, additional energy is transferred from PEG 10 for storage in inductor L1 and capacitor C1.

The energy transferred to the L1 and C1 networks causes a current (I) to flow in capacitor C1, which current causes the voltage across C1 to increase by the well known relationship of $V=(I/C)\Delta T$. As shown in waveform F of FIG. 3, the voltage across capacitor C1 increases incrementally each time an additional amount of current is coupled into the capacitor C1.

The voltage across C1 results in an energy storage of ½ $CV^2$. It is significant that the energy stored in a capacitor increases as the square of the voltage. Hence, where the voltage is doubled, the stored energy goes up by a factor of four (4). Accordingly, Applicant's invention optimizes this result.

Figure 4:
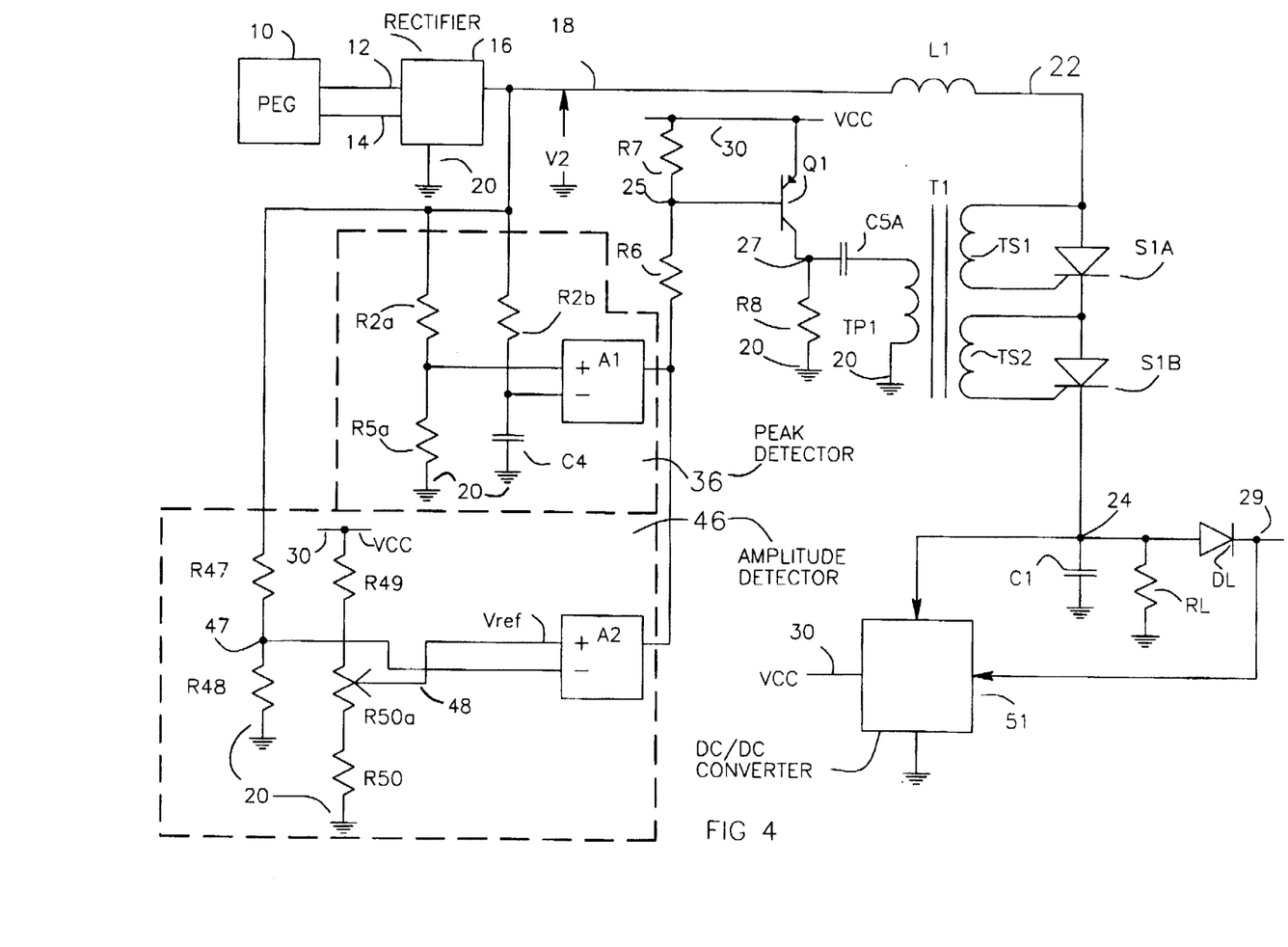

In the circuit of FIGS. 1 and 2, very high voltages may be generated across the output terminals (18,20) of rectifier network 16. To limit the voltage V2 at the output of network 16, the circuit of FIGS. 1 and 2 may be modified as shown in FIG. 4 which is similar to that of FIG. 1, except that in FIG. 4, an amplitude detector circuit 46 has been added, in addition to the peak detection network 36, to turn on transistor Q1 whenever the amplitude of the voltage V2 at terminal 18 exceeds a predetermined value. This is done to prevent too high a voltage to be developed at terminal 18 and at other points of the circuit where such a high voltage might cause breakdown of certain components or to enable the circuit to be manufactured with lower breakdown, and hence, lower cost components.

The amplitude detector network 46 includes: a) a first resistor divider network comprised of a resistor R47 connected between terminals 18 and a node 47 and a resistor R48 connected between node 47 and ground terminal 20; b) a second resistor divider network comprised of a resistor R49 connected between a terminal 30 to which is applied a regulated operating voltage (i.e., Vcc volts) and one end of a potentiometer R50a and a resistor R50 connected between the other end of R50a and ground terminal 20. A wiper arm 48 on resistor 50a is connected to one input (+) of a comparator A2 and another input (−) of comparator 46 is connected to node 47.

In the circuit of FIG. 4, two SCR's (S1A and S1B) are connected in series between terminals 18 and 24. The use of two SCR's connected in series allows components with lower voltage breakdown values to be used. In the circuit of FIG. 4, the two SCR's, S1A and S1B are turned on at the same time by means of secondary windings TS1, TS2 of a transformer T1 being connected between their respective gates and cathodes. When a turn-on pulse is applied to the primary TP1 of T1, turn-on pulses are concurrently generated across the secondaries, TS1 and TS2, in a direction to turn-on S1A and S1B.

The amplitude detector 46 is set such that whenever the voltage at node 47 exceeds the voltage applied to node 48, the output of comparator A2 goes low, turning-on Q1 and producing a pulse at the collector of Q1 which is coupled via a capacitor C5a to the primary winding TP1 of transformer T1. The pulse is then coupled to the secondary windings TS1 and TS2 of transformer T1 to turn-on S1A and S1B simultaneously.

For example, where V2 may reach peak values of 2,000 volts, or more (if uncontrolled), and it is desired to limit the voltage at terminal 18 to 1,000 volts, amplitude detector 46 would be set to produce a turn-on signal to Q1 whenever V2 at terminal 18 is about 1,000 volts. For this condition (i.e., V2 is about 1,000 volts) detector 46 would turn on Q1 which would apply a turn-on pulse to the primary of transformer TP1. However, note that for the condition where the peak voltage at terminal 18 is, or would be, 1,000 volts or less, the peak detector 36 would respond and turn-on Q1, as discussed above for FIGS. 1 and 2.

In FIG. 4 a diode, DL, is connected between output terminal 24 and a further output terminal 29. The diode DL functions to isolate terminal 29 from a short circuit or other problem associated with, or present at terminal 24, as discussed below for FIG. 8. The isolating diode enables two, or more, power conversion circuits of the type shown in FIGS. 1, 2 and 4 to be connected together at terminal 29 to drive a common load present at terminal 29.

The voltage developed at output terminal 24 and/or the voltage developed at output terminal 29 may be applied to a DC to DC converter 51 to generate the voltage Vcc, distributed via line 30, which will be a regulated, relatively well defined operating potential useable to produce desired reference voltages.

Figure 5:
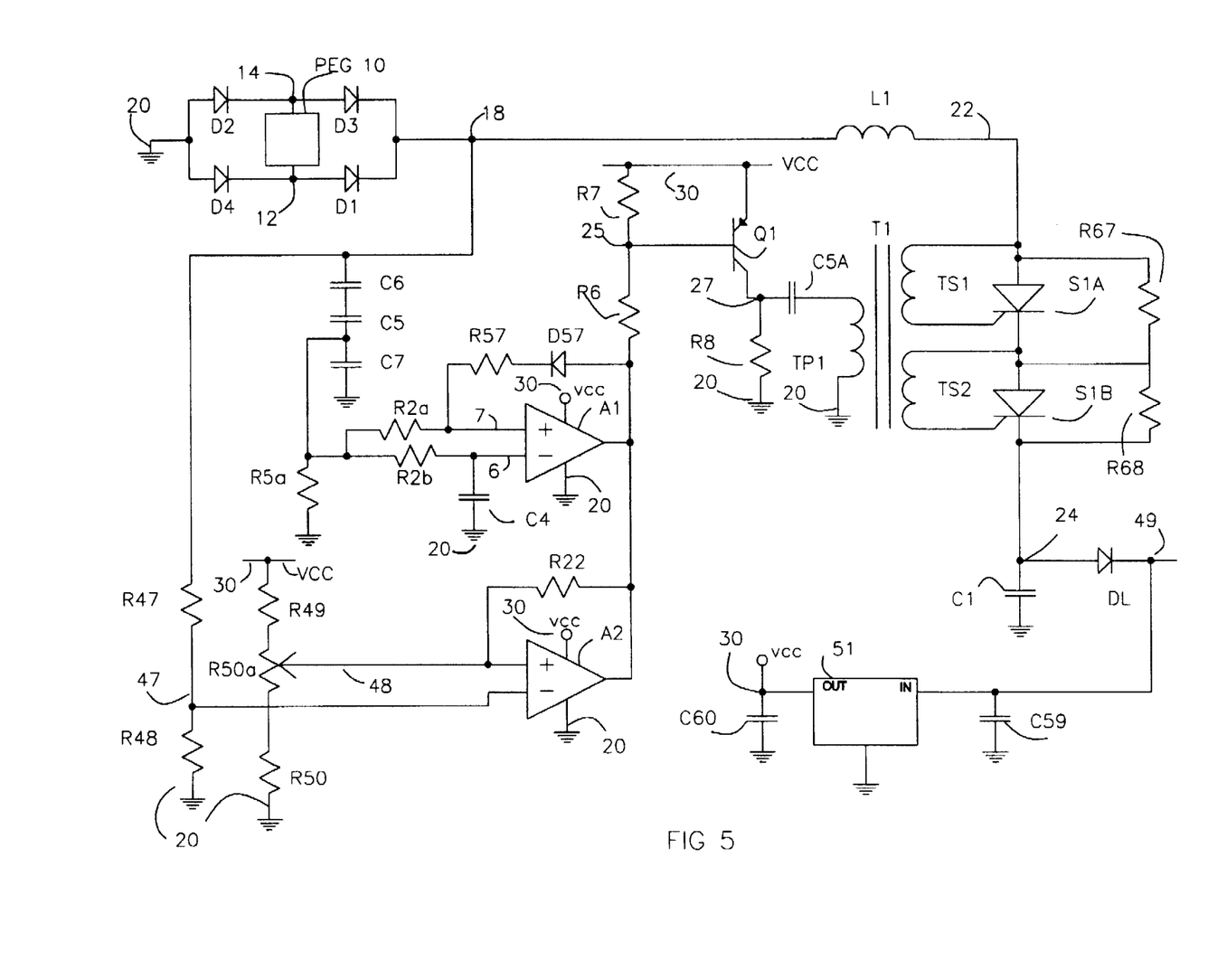

FIG. 5 shows in greater detail circuitry used to implement the peak detector circuit 26 and the amplitude detector circuit 46. In FIG. 5, a capacitive divider network comprised of capacitors C5, C6 and C7 is connected between terminal 18 and ground to produce a divided down lower amplitude voltage (VD) which is applied to and sensed by the peak detector network. Except for the voltage divider network, the peak detector network of FIG. 5 (A1, R2a, R5a, R2b, C4, R57 and D57) is similar in structure and operation to that of FIG. 4. Likewise, the amplitude detector network of FIG. 5 (A2, R47, R48, R49, R50a and R50) is similar to that of FIG. 4 and need not be further detailed. Furthermore, as discussed for FIG. 4, the operation of the circuits of FIGS. 4 and 5 is similar to that of FIGS. 1 and 2 except that SCRs S1A and S1B are turned on:

a) whenever the voltage V2 exceeds a predetermined voltage value (e.g., 1,000 volts); or
 b) following the detection of a peak voltage condition.

Figure 6:
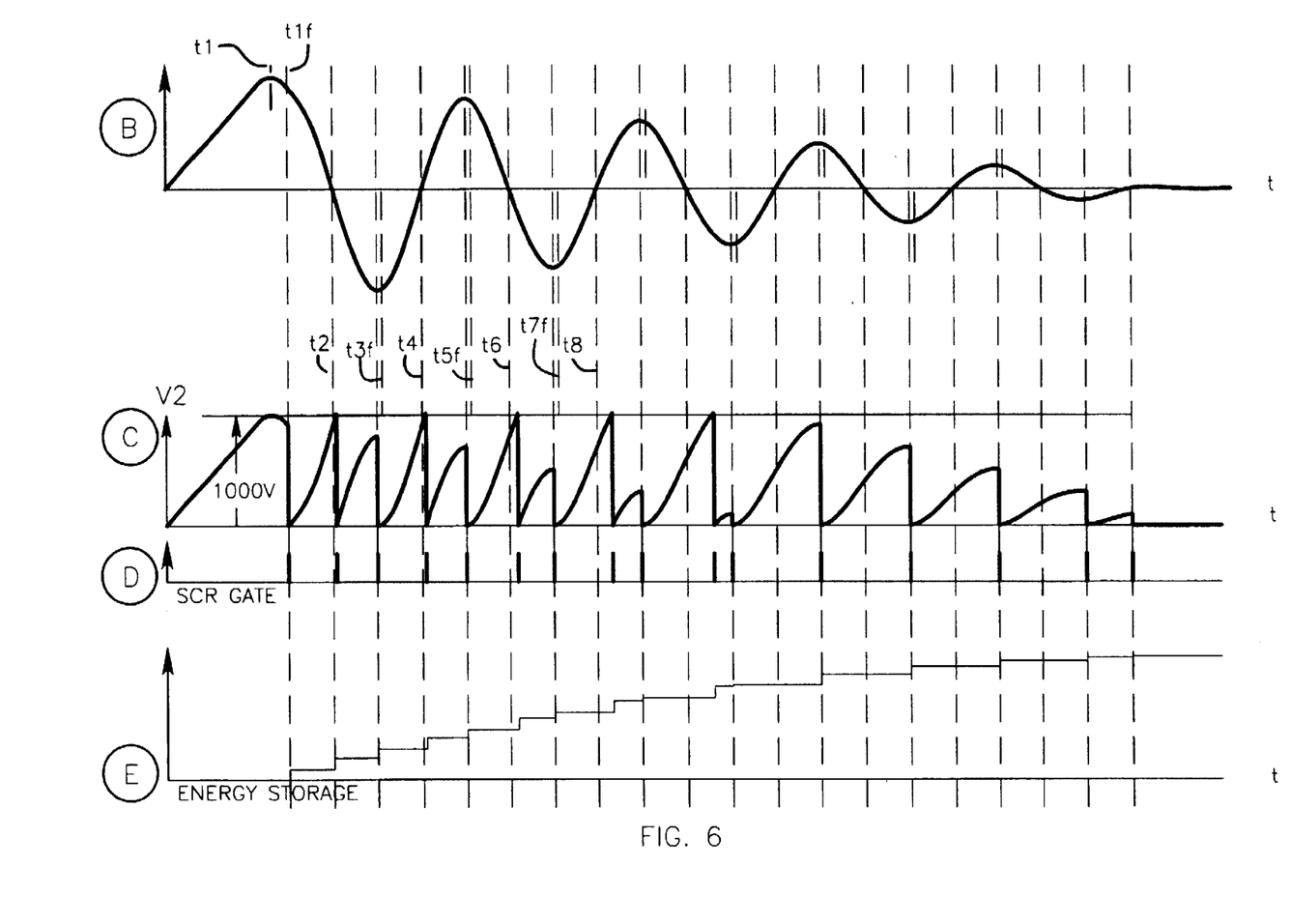

FIG. 6 shows the waveforms produced at various nodes of the circuit of FIGS. 4 and 5. The resultant shape of V2 is shown in waveform C of FIG. 6 and the timing of the pulses turning-on SCRs S1A and S1B is shown in waveform D of FIG. 6. The voltage developed across capacitor C1 is shown in Waveform E of FIG. 6. Note that there is an incremental increase in the voltage developed across C1 each time the SCR's are turned-on.

Figure 7:
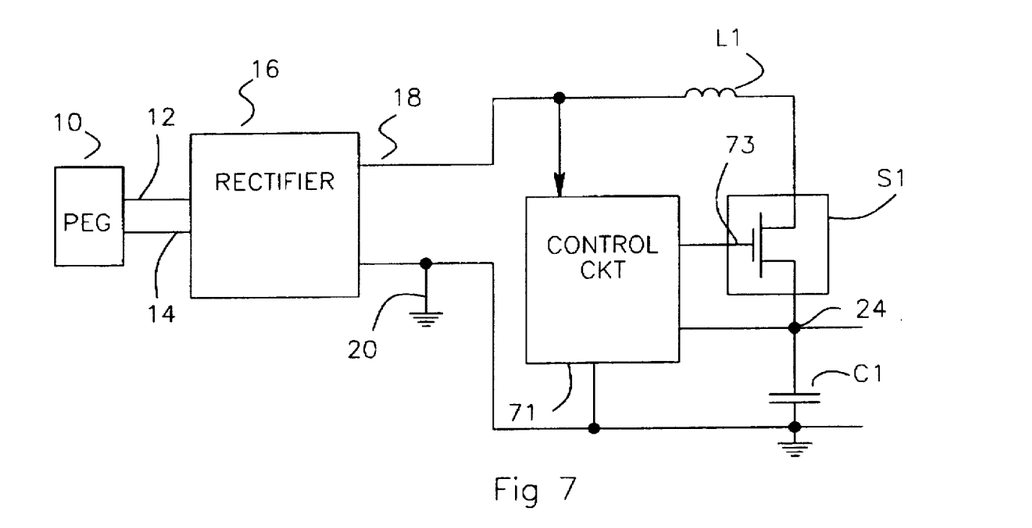
Figure 7A:
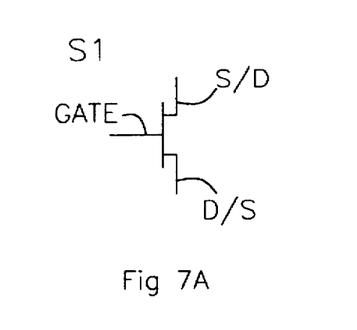
Figure 7B:
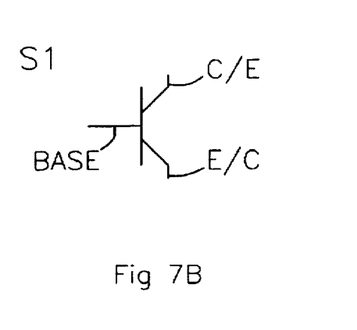

In FIGS. 1, 2 4, and 5, the switching means for selectively coupling the L1,C1 network across terminals 18 and 20 are SCRs. Other switching means may be used. FIG. 7 shows that the SCR may be replaced by a transistor switch S1. FIG. 7A shows that S1 may be a field-effect transistor (FET) and FIG. 7B shows that S1 may be a bipolar transistor. The transistor switch shown in FIG. 7A may be an insulated-gate FET (IGFET) of P or N conductivity type; Likewise, the bipolar transistor switch shown in FIG. 7B may be a bipolar transistor of P or N conductivity type; with the transistor having collector (C) and emitter (E) regions defining the ends of its main conduction path and a control (base) electrode. Where and when a transistor switch is used (instead of an SCR), an appropriate control circuit must be coupled to the control electrode of the transistor switch to ensure that it is turned-on at an appropriately selected voltage or time condition and that it is turned-off at the end of each charge cycle and that it remains turned-off until selectively turned-on. This is illustrated in FIG. 7 by means of control circuit 71 having an output 73 connected to the gate or control electrode of the switch means S1.

Figure 8:
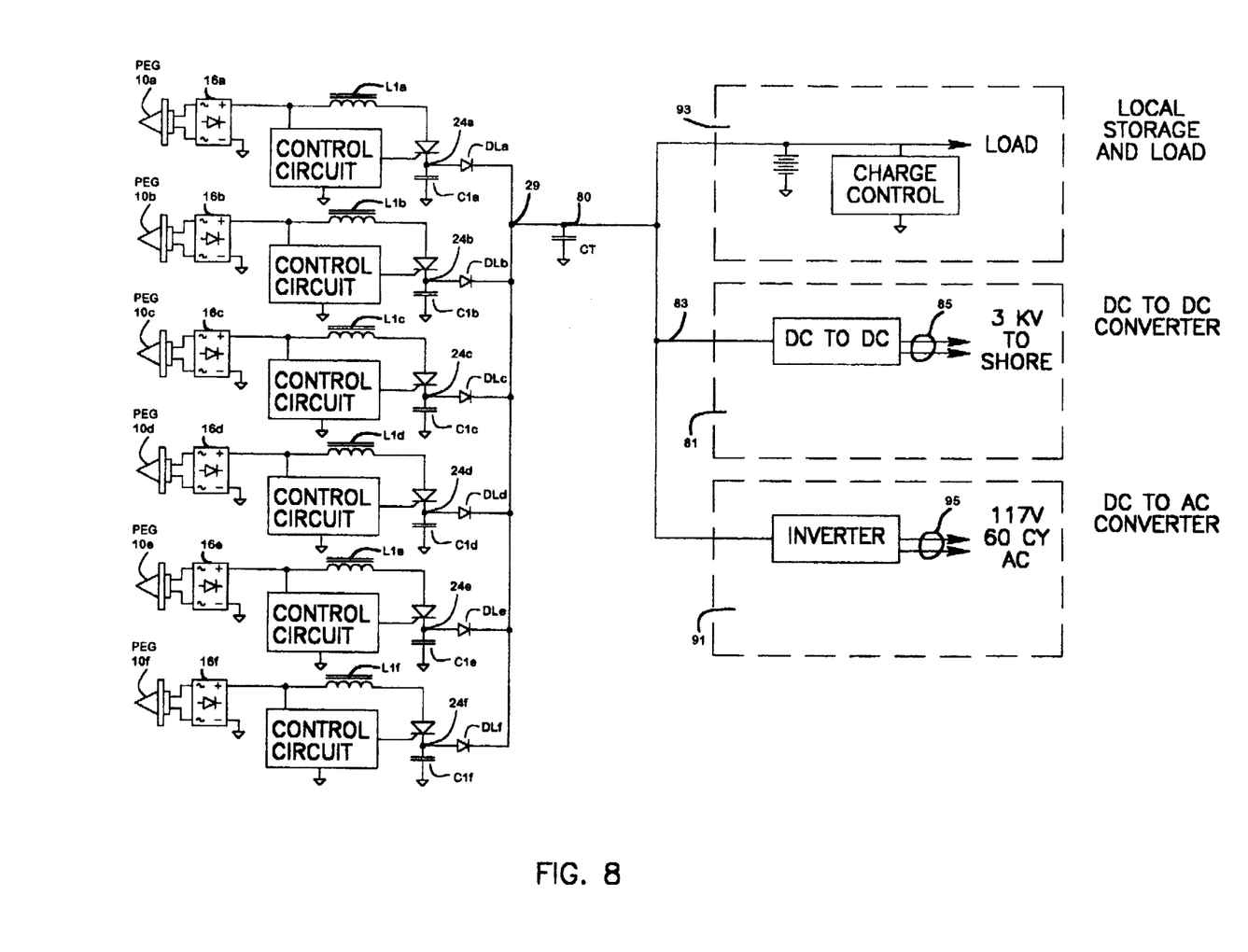

FIG. 8 shows in block diagram form that the output terminals, 24i, of a multiplicity of PEGs, 10i, may be interconnected via isolating diodes (DLi) to charge a common storage element represented by a capacitor CT connected to a common terminal 29. It should be appreciated that the storage element could be a battery instead of a capacitor, and that the capacitor CT is used for illustrative purposes, only.

The energy stored in capacitor CT may be distributed in several different ways as illustrated in FIG. 8. Assume, for example, that the voltage produced on CT has a value of 24 volts. This voltage may be applied to a DC to DC converter 81 which could convert the 24 volts to, for example, 3000 volts for transmission to a remote site. For example, the PEG and its associated power conversion circuitry, including capacitor CT and converter 81, may be located offshore (e.g., in some body of water whose movement stresses the PEGs) and output lines 85 from converter 81 can carry the 3,000 volts to an on shore facility. In a similar manner, the output across CT produced at terminal 80 may be applied to an inverter circuit 91 to produce a 117 volts 60 cycle AC voltage which may be carried via lines 95 from the offshore electricity producer to a remote on shore electricity user.

In conjunction with a local or remote energy storage means such as a battery or a capacitor bank or storing the charge produced by one or more PEGs, it may be necessary to include a charge control circuit 93 to either disable energy collection or bypass excess energy to a load such as a heating element. This would function to prevent damage to the storage device in the event of an over voltage or excessive energy condition.

In the circuits of FIGS. 1, 2, 4, 5 and 7, the switching element S1, which may be an SCR or transistor, is connected between the inductor L1 and the capacitor C1.

Figure 9:
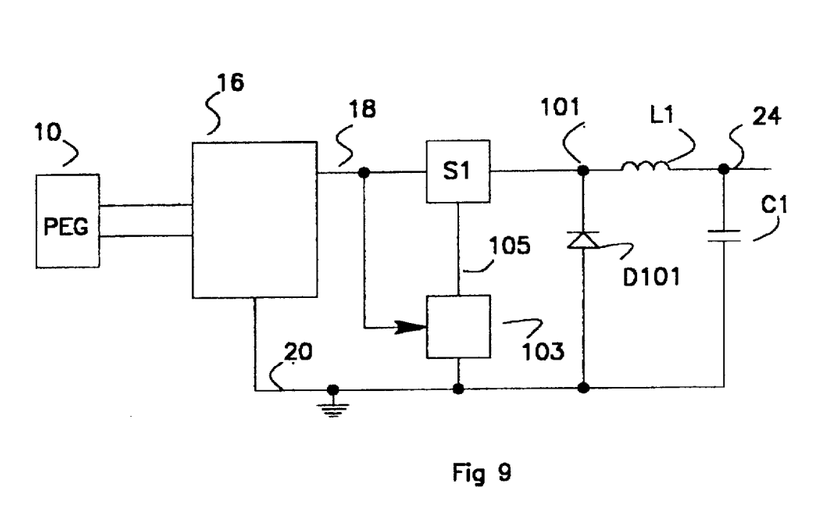
Figure 9A:
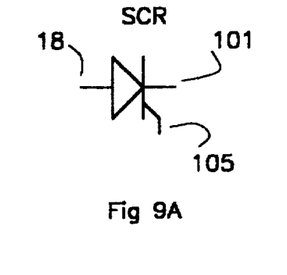
Figure 9B:
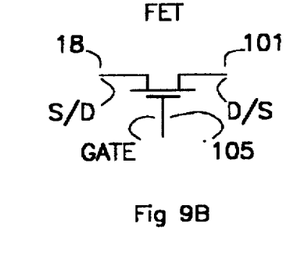
Figure 9C:
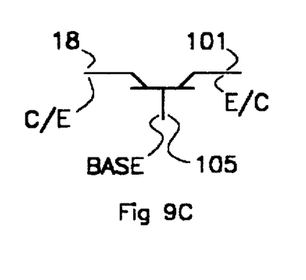

It should be noted that, as shown in FIG. 9, the switching element, S1, can be connected between terminal 18 and one end of the inductor L1 at node 101, with the inductor being connected between the switching element and one end of the capacitor C1 at terminal 24. In this configuration, it is desirable to have a diode D101 connected between the other end of C1, which is connected to ground, and node 101. A control circuit 103, similar to the peak detector and/or amplitude detector described above, is then connected to the control electrode 105 of the switching element S1 to control its turn-on and turn-off. The control circuit 103 senses the voltage at terminal 18, as discussed above, to produce a turn-on and/or turn-off signal to the switching element S1. The switching element S1 may be an SCR as shown in FIG. 9A or a field effect or bipolar transistor as shown in FIGS. 9B and 9c, respectively.

What is claimed is:

1. A combination comprising:

a piezoelectric generator (PEG) having first and second terminals across which an alternating current (AC) electrical signal is generated when the PEG is stressed;

rectifying means having an input means coupled across said first and second terminals of said PEG and having an output means for producing thereat a rectified output signal corresponding to said generated AC electrical signal;

means connecting a switch means in series with an inductor and a charge storage means across the output means of the rectifying means; and enabling means coupled to said switch means for selectively enabling said switch means, said enabling means including means for sensing the amplitude of the voltage at the output of the rectifying means and for sensing when the amplitude of the voltage has peaked and for then producing a turn-on pulse to enable said switch means and causing the inductor and charge storage means to be connected in circuit with said PEG for absorbing and storing the electrical energy generated by the PEG.

2. A combination as claimed in claim 1, wherein said means for sensing the amplitude of the voltage at the output of the rectifying means includes:

(a) means for sensing when the amplitude of the voltage has peaked and for then producing a turn-on pulse to said switch means; and (b) means for sensing when the amplitude of the voltage has exceeded a predetermined value for then producing a turn-on pulse to said selectively enabled switch means.

3. A combination as claimed in claim 1, wherein said rectifying means includes a full wave rectifier having first and second rectifier input terminals respectively connected to said first and second terminals of said PEG, and having first and second rectifier output terminals; with said switch means and said inductor and capacitor being connected in series across said first and second rectifier output terminals; and wherein said charge storage means is a capacitor.

4. A combination as claimed in claim 3, wherein said switch means is a silicon controlled rectifier (SCR), having an anode and a cathode defining the main conduction path of the SCR, and having a control electrode for controlling the turn-on of the SCR;

wherein the anode-to-cathode path of the SCR is connected in series with the inductor between the first rectifier output terminal and a power output terminal; and wherein said capacitor is connected between said power output terminal and the second rectifier output terminal.

5. A combination as claimed in claim 4, wherein said means coupled to said switch means for selectively enabling the switch means includes a control circuit connected between the first rectifier output terminal and the control electrode of the SCR.

6. A combination as claimed in claim 5, wherein the control circuit includes means for sensing when the amplitude of the voltage at the first rectifier output terminal has peaked and for then producing a turn-on pulse which is applied to the control electrode of the SCR for enabling the SCR to conduct until the current therethrough decreases below the holding current of the SCR.

7. A combination as claimed in claim 3, wherein said switch means has a main conduction path and a control electrode, said inductor has a conduction path and said capacitor has first and second plates; wherein the main conduction path of the switch means is connected in series with the conduction path of the inductor between the first rectifier output terminal and the first plate of the capacitor and wherein the second plate of the capacitor is coupled to the second rectifier output terminal.

8. A combination as claimed in claim 7 wherein the switch means is a transistor.

9. A combination as claimed in claim 7, wherein said means coupled to said switch means for selectively enabling the switch means includes a control circuit connected between the first rectifier output terminal and the control electrode of the switch means.

10. A combination as claimed in claim 9 wherein one end of the conduction path of the inductor is connected to the first rectifying output terminal and wherein the main conduction path of the switch means is connected between the other end of the conduction path of the inductor and the first plate of the capacitor.

11. A combination comprising:

a piezoelectric generator (PEG) having first and second terminals across which an alternating current (AC) electrical signal is generated when the PEG is stressed; said AC signal varying about a reference potential so as to increase above and decrease below said reference potential;

rectifying means having an input means coupled across said first and second terminals of said PEG and having first and second output terminals for producing thereat a rectified output signal corresponding to said generated AC electrical signal;

means coupling a selectively enabled switch means in series with an inductor and a charge storage means across the first and second output terminals of the rectifying means; and enabling means for sensing the voltage at the output of the rectifying means, said enabling means being coupled to said switch means and being responsive to said AC signal attaining a certain level for enabling said switch means and causing the inductor and charge storage means to be connected in circuit with said PEG for absorbing and storing the electrical energy generated by the PEG, and said switch means being disabled, within a first time period of being enabled, for removing the loading effect of the inductor and storage means and enabling the maximum amplitude of the signal produced between said first and second output terminals of said rectifying means to exceed the amplitude of the corresponding AC signal relative to said reference potential.

12. A combination as claimed in claim 11 wherein the charge storage means is a capacitor.

13. A combination as claimed in claim 12, wherein said means for sensing the amplitude of the voltage at the output of the rectifying means includes means for sensing when the amplitude of the voltage has peaked and for then producing a turn-on pulse to said switch means.

14. A combination as claimed in claim 12, wherein said means for sensing the amplitude of the voltage at the output of the rectifying means includes:
   (a) means for sensing when the amplitude of the voltage has peaked and for then producing a turn-on pulse to said switch means; and
   (b) means for sensing when the amplitude of the voltage has exceeded a predetermined value for then producing a turn-on pulse to said selectively enabled switch means.

15. A combination as claimed in claim 12, wherein said rectifying means includes a full wave rectifier having first and second rectifier input terminals respectively connected to said first and second terminals of said PEG, and having first and second rectifier output terminals; with said switch means and said inductor and capacitor being connected in series across said first and second rectifier output terminals.

16. A combination as claimed in claim 12, wherein said switch means is a silicon controlled rectifier (SCR), having an anode and a cathode defining the main conduction path of the SCR, and having a control electrode for controlling the turn-on of the SCR;
   wherein the anode-to-cathode path of the SCR is connected in series with the inductor between the first rectifier output terminal and a power output terminal; and
   wherein said capacitor is connected between said power output terminal and the second rectifier output terminal.

17. A combination comprising:
   a piezoelectric generator (PEG) having first and second terminals across which an AC electrical signal is generated when the PEG is stressed;
   a rectifying means having an input means coupled across said first and second terminals of said PEG and having first and second output terminals for producing thereat a rectified output signal corresponding to said generated electrical signal;
   an inductor;
   a capacitor;
   a selectively enabled switching means;
   means for coupling said selectively enabled switch means in series with said inductor and in series with said capacitor across said first and second output terminals of the rectifying means; and
   said selectively enabled switch means being connected between said inductor and said capacitor.

18. A combination as claimed in claim 17, wherein said selectively enabled switch means includes means coupled to the output means of said rectifying means for sensing the amplitude of the voltage at the output of the rectifying means and responsive to the amplitude of the voltage attaining a certain value for then enabling said switching means and causing the inductor and capacitor to be connected in circuit with said PEG for absorbing and storing the electrical energy generated by the PEG.

19. The combination as claimed in claim 18, wherein said means for sensing the amplitude of the voltage at the output of the rectifying means and responsive to the amplitude of the voltage attaining a certain value includes means for sensing when the amplitude of the voltage has peaked and for producing a turn-on pulse to said selectively enabled switch means in response to the amplitude of the voltage decreasing from the peak value.

20. The combination as claimed in claim 18, wherein said means for sensing the amplitude of the voltage at the output of the rectifying means and responsive to the amplitude of the voltage attaining a certain value includes:
   (a) means for sensing when the amplitude of the voltage has peaked and for producing a turn-on pulse to said selectively enabled switch means in response to the amplitude of the voltage decreasing from the peak value; and
   (b) means for sensing when the amplitude of the voltage has exceeded a predetermined value for then producing a turn-on pulse to said selectively enabled switch means.

21. The combination as claimed in claim 18, wherein said rectifying means includes a full wave rectifier having first and second rectifier input terminals respectively connected to said first and second terminals of said PEG, and having first and second rectifier output terminals; with said switch means and said inductor and capacitor being connected in series across said first and second rectifier output terminals.

22. The combination as claimed in claim 21, wherein said selectively enabled switch means is a silicon controlled rectifier (SCR), having an anode and a cathode defining the main conduction path of the SCR, and having a control electrode for controlling the turn-on of the SCR;
   wherein the anode-to-cathode path of the SCR is connected in series with the inductor between the first rectifier output terminal and a power output terminal; and
   wherein said capacitor is connected between said power output terminal and the second rectifier output terminal.

23. The combination as claimed in claim 22, wherein said means coupled between the output of the rectifying means and the selectively enabled switch means includes a control circuit connected between the first rectifier output terminal and the control electrode of the SCR.

24. The combination as claimed in claim 23, wherein the control circuit includes means for sensing when the amplitude of the voltage at the first rectifier output terminal decreases below a previous peak to then produce a turn-on pulse which is applied to the control electrode of the SCR, whereby the SCR continues to conduct until the current therethrough decreases below the holding current of the SCR.

* * * * *